US011820066B2

(12) United States Patent
Wiercinski (10) Patent No.: US 11,820,066 B2
(45) Date of Patent: Nov. 21, 2023

(54) ARRANGEMENT FOR SUPPLYING A SEMI-FINISHED PRODUCT TO A THERMOFORMING MACHINE, THERMOFORMING ARRANGEMENT, AND METHOD

(71) Applicant: GEISS AG, Sesslach (DE)

(72) Inventor: Miroslaw Wiercinski, Sonnefeld (DE)

(73) Assignee: GEISS AG, Sesslach (DE)

( * ) Notice: Subject to any disclaimer, the term of this patent is extended or adjusted under 35 U.S.C. 154(b) by 91 days.

(21) Appl. No.: 17/496,004

(22) Filed: Oct. 7, 2021

(65) Prior Publication Data

US 2022/0111576 A1 Apr. 14, 2022

(30) Foreign Application Priority Data

Oct. 9, 2020 (EP) ..................................... 20201139

(51) Int. Cl.
*B29C 51/26* (2006.01)
*B29C 51/18* (2006.01)
*B29K 701/12* (2006.01)

(52) U.S. Cl.
CPC ............ *B29C 51/261* (2013.01); *B29C 51/18* (2013.01); *B29K 2701/12* (2013.01)

(58) Field of Classification Search
CPC ....... B29C 51/261; B29C 51/18; B29C 51/20; B29K 2701/12
See application file for complete search history.

(56) References Cited

U.S. PATENT DOCUMENTS 6,367,361 B1 * 4/2002 Christensen ............ B29C 51/08
264/163
2004/0232601 A1 * 11/2004 Kundinger ............ B29C 51/261
425/308

FOREIGN PATENT DOCUMENTS

DE 102019113458 A1 * 11/2020
EP 1182022 A1 2/2002
GB 2175868 A 12/1986
(Continued)

OTHER PUBLICATIONS

European Search Report for EP20201139 dated Mar. 19, 2021.
English Abstract of EP1182022, Publication Date: Feb. 27, 2002.

*Primary Examiner* — Kelly M Gambetta
*Assistant Examiner* — Virak Nguon
(74) *Attorney, Agent, or Firm* — MILLEN, WHITE, ZELANO & BRANIGAN, P.C.; William Nixon (57) ABSTRACT

The invention relates to an arrangement for supplying a semi-finished product to a thermoforming machine as a starting material for thermoforming. The arrangement has a deposition device on which cuttings of the starting material which are to be processed in succession can be provided, in each case in an at least partially automated manner, and a movable loading unit. This loading unit is set up for at least one of the cuttings to be received on the loading unit. The loading unit can be positioned to receive the cutting from the deposition device, and the loading unit can subsequently be positioned to deposit the cutting received from the deposition device in a working region of the thermoforming machine. The invention further relates to a thermoforming arrangement and to a method for supplying a semi-finished product to a thermoforming machine as a starting material for thermoforming.

13 Claims, 4 Drawing Sheets

(56) References Cited

FOREIGN PATENT DOCUMENTS

JP          36115632 A     1/1986
WO     2004091881 A2   10/2004

\* cited by examiner

ARRANGEMENT FOR SUPPLYING A SEMI-FINISHED PRODUCT TO A THERMOFORMING MACHINE, THERMOFORMING ARRANGEMENT, AND METHOD

FIELD OF THE INVENTION

The present invention relates to an arrangement for supplying a semi-finished product to a thermoforming machine as a starting material for thermoforming. The invention further relates to a thermoforming arrangement comprising an arrangement of this type for supplying the semi-finished product and to a method for supplying a semi-finished product to a thermoforming machine as a starting material for thermoforming.

TECHNICAL BACKGROUND

Thermoforming machines make it possible to produce shaped parts from an in particular flat starting material, which is provided for example in the form of plastics material films or plastics material plates, using the effect of heat. This may for example take place in that the starting material, for example a thermoplastic plastics material, is initially heated by a heating device and thus warmed, and subsequently brought into the desired shape using a shaping tool. Thus, in each case this starting material is a semi-finished product which is processed further using the thermoforming machine.

In a fully automatic machine, the semi-finished product is supplied to the thermoforming machine in a conventional manner, either from a roll or from plate cuttings.

For example, in a conventional arrangement, a loading machine is provided, and can receive a plate stack, in other words a stack of suitable plate-shaped material pieces, on a vertically displaceable table. This plate stack is laid in the loading machine. During operation, the table can move upwards cyclically, a loading carriage drawing the uppermost plate from this stack at the upper face of said carriage and transporting it into the thermoforming machine. Subsequently, the loading carriage travels back out of the thermoforming machine to fetch the following plate from the stack. Upon travelling back into the thermoforming machine, the loading carriage can then deposit the next plate of the starting material for the following shaping process in the thermoforming machine from the upper face of said carriage, while the finished shaped part from the just ended shaping step simultaneously falls onto the upper face of the loading carriage and is transported out of the machine when the loading carriage travels out.

Using this procedure, shaped parts can be produced from a stack of plate cuttings both positively, in other words from the inlay plane upwards, and negatively, in other words from the inlay plane downwards.

In the case of rolled goods, the material thickness is generally limited, but rolled goods are generally more cost-effective than plate goods.

In a typical rolling machine, in a conventional construction, a material web, for example a plastics material, is drawn from a roller into a thermoforming machine using a pin chain. After deformation, the rolled material is transported onwards, resulting in a plurality of shaped parts in succession on the rolled goods. These shaped parts are only individuated at the end of the transportation process. Using a procedure of this type, the more cost-effective rolled goods can be used.

However, it has been found that shaped parts which are negatively shaped using a procedure of this type cannot be produced automatically, or else that this requires considerable additional mechanical outlay. Nevertheless, even in the latter case, the potential drawing depth of the thermoforming machine cannot be exploited using the conventional procedure if rolled goods are used.

In addition, machines have previously been proposed in which rolled goods are cut off during transportation, upstream from or in the pin chain, and subsequently handled as an individual plate in this pin chain. However, this does not overcome the limitations of the conventional roller design as described above.

Moreover, if a pin chain is used, piercing into the transported material can result in material particles or splinters, which may in many cases be disruptive and which make it at least more difficult or more complex to produce shaped parts of a high quality, in particular of a high surface quality.

Moreover, plate cuttings of a plastics material which are stacked into a stack in advance may attract dirt particles or dust as a result of electrostatic charge, and this may likewise be undesirable when producing particularly high-grade shaped parts.

SUMMARY OF THE INVENTION

Against this background, the object of the invention is to improve further the supply of a semi-finished product to a thermoforming machine as a starting material and in doing so to overcome at least some of the aforementioned drawbacks of conventional procedures.

According to the invention, this object is achieved by an arrangement having the features of claim 1 and/or by an arrangement having the features of claim 13 and/or by a method having the features of claim 14.

An arrangement for supplying a semi-finished product to a thermoforming machine as a starting material for thermoforming is proposed, the arrangement having a deposition device on which cuttings of the starting material which are to be processed in succession can be provided, in each case in an at least partially automated manner. The arrangement further has a movable loading unit, which is set up for at least one of the cuttings to be received on the loading unit. This loading unit can be positioned to receive the cutting from the deposition device. Further, the loading unit can subsequently be positioned to deposit the cutting received from the deposition device in a working region of the thermoforming machine.

A thermoforming arrangement is further proposed, comprising a thermoforming machine and comprising an arrangement of this type for supplying a semi-finished product to supply the semi-finished product to the thermoforming machine as a starting material for the thermoforming.

A method is further proposed for supplying a semi-finished product to a thermoforming machine as a starting material for thermoforming, the method comprising:
  providing one of a plurality of successive cuttings of the starting material on a deposition device in an at least partially automated manner;
  receiving the cutting provided on the deposition device from said device using a movable loading unit;
  moving the loading unit; and
  depositing the cutting received on the loading unit from the deposition device in a working region of the thermoforming machine.

An idea underlying the invention consists in receiving the cuttings, provided on the deposition device in an at least partially automated and preferably fully automated manner, from the deposition device, moving the loading unit along with the cutting received thereon and thus bringing it into a different position, and then being able to deposit the cutting directly in the working region of the thermoforming machine reliably and precisely. Thus, neither the use of pin chains, or other measures which can pierce through the starting material to be processed and thus bring about particle formation, nor the use of a stack of ready-supplied cuttings is required. Instead, it is possible to introduce the cuttings individually and further to handle, for example to clean, the individual cuttings individually, as required and within the processing process, immediately before they are supplied to the thermoforming machine and thus immediately before shaping, where required or desired. In addition, as considered from the inlay plane, both positive and negative production are possible without limitation while exploiting the drawing depth of the thermoforming machine. In particular, by providing the cuttings, which are processed in succession, on the deposition device using a consistent transportation method in each case and with consistent shaped part handling, automated production is further possible, irrespective of whether plate goods or rolled goods are used as a starting semi-finished product.

The method according to the invention may in particular be carried out using the supplying arrangement according to the invention.

Advantageous embodiments and developments may be derived from the dependent claims and from the description with reference to the drawings.

In an embodiment, the arrangement has an unrolling device, arranged upstream from the deposition device, for unrolling rolled goods. Thus, production from the rolled goods is advantageously possible, making it possible to exploit the cost advantages of rolled goods. At the same time, the finished shaped parts may be transported and handled consistently, in a manner analogous to thermoforming from plate goods. Even in the case of production from rolled goods, the drawing depth of the thermoforming machine can advantageously be exploited.

In a further embodiment, the arrangement comprises a separating device, in particular a cutting device, set up to separate off a piece of the rolled goods, which are unrolled in regions using the unrolling device and in particular deposited at least in regions on the deposition device, to form the cuttings of the starting material. Thus, the cuttings can be cut to size directly before they are processed by thermoforming, for example in a manner cycled in accordance with the work cycle of the thermoforming machine.

In particular, the separating device is arranged downstream from the unrolling device.

In an embodiment, the arrangement for providing the cuttings of the starting material on the deposition device is set up as a cutting of plate goods in each case. Plate goods may be understood to be prefabricated cuttings which are supplied gathered together. This makes it possible to manufacture the shaped parts from plate goods, for example if the material thickness is too high to supply the starting material as rolled goods. However, even starting material which could still perfectly well be rolled up in view of its material thickness may also be provided as a cutting which is supplied prefabricated and thus as plate goods. Advantageously, a further workstation, for example a cleaning device which is passed through by individual cuttings, may be positioned upstream from the automated provision of the cutting on the deposition device. In this embodiment, the plate goods are thus introduced from externally, for example from an external store or an external source, and the cuttings are provided on the deposition device, in particular individually, in each case in an at least partially automated manner, preferably fully automatically.

In particular, the loading unit has at least one portion which is set up for one of the cuttings to be received on the portion. In particular, the portion can be positioned for receiving the cutting from the deposition device and for depositing the cutting in the working region of the thermoforming machine by moving the loading unit.

In an embodiment, the loading unit is formed as a movable loading carriage. Movement of the loading unit can thus be achieved in a simple, expedient manner.

In an embodiment, the movable loading unit is displaceable above the deposition device. Preferably, the movable loading unit is displaceable in a substantially horizontal direction. In this manner, it is advantageously achieved that the cuttings are received on the loading unit from below in each case, in particular on the portion of the loading unit provided for this purpose, it being possible to provide the cuttings on the deposition device in particular substantially horizontally in each case, for example on a substantially horizontal surface.

In a development, the cuttings can each be received on a lower face of the loading unit, in particular on the portion of the loading unit provided for this purpose, the loading unit being equipped with receiving means, in particular in the region of the lower face thereof, for this purpose.

In an embodiment, the receiving means may for example be formed as suction devices.

In an embodiment, the movable loading unit can be displaced at least in portions into the working region of the thermoforming machine. This can contribute to reliable deposition of the cutting in the correct position in the working region. This further contributes to efficiently transporting a finished shaped part out.

In an embodiment, the loading unit is arranged movably in such a way that a shaped part—produced by thermoforming, from a cutting previously deposited in the working region of the thermoforming machine, and subsequently demoulded—can be deposited on an upper face of the loading unit, in particular in the position of the loading unit in which the loading unit is positioned for depositing the cutting in the working region of the thermoforming machine. The demoulded shaped parts can thus be transported out of the working region individually in succession, without impeding the transportation and deposition of the following cutting. For example, the shaped part can be raised by a tenter of the thermoforming machine in such a way that the loading unit can be moved in between the demoulded shaped part and an inlay plane or tentering plane for the next cutting. It is thus possible to shape shaped parts both positively and negatively with respect to this plane, without the achievable drawing depth being limited by the handling process.

In one possible embodiment, the deposition device may be formed as a table.

In a preferred embodiment, the deposition device is formed with a transportation device, for example with a belt-like transportation device. This may improve the handling of the semifinished product, for the at least partially and preferably fully automated provision of the cuttings which are to be processed in succession, in particular if the semi-finished product is provided as rolled goods. This also contributes to correct positioning of an individual cutting during provision.

In particular, the transportation device of the deposition device provides a movable, preferably substantially horizontally movable, deposition surface, which preferably extends substantially horizontally.

In an embodiment, the loading unit has a first portion and a second portion, the first and the second portion each being set up for a cutting of the starting material to be received on the portion, and the first portion being positionable for the cutting to be received by the deposition device. This increases the flexibility when the arrangement is used for supplying the semi-finished product, especially since one of the first and second portions of the loading unit remains available for a further cutting, while the other of the first and second portions, in particular the first portion positionable above the deposition device, can be for receiving the cutting from the deposition device and in particular for directly depositing it in the working region. For example, the second portion can make it possible to receive another cutting from another point in the arrangement. In an alternative embodiment, however, the second portion could be provided for receiving a cutting from the deposition device, while the first portion remains available for a further cutting.

In a further embodiment, the first and the second portion of the loading unit are arranged in succession in a movement direction of the loading unit. This facilitates positioning the portions by moving the loading unit.

Further, in an embodiment, the arrangement for supplying the semi-finished product may have a loading device which comprises the loading unit and a table device. The second portion of the loading unit may be positionable in particular for receiving another cutting from the table device and for depositing this other cutting, received from the table device, in the working region of the thermoforming machine, the first portion of the loading unit being positionable for receiving a cutting from the deposition device. In a further conceivable embodiment, the first and the second portion of the loading unit are respectively positionable above the deposition device, above the table device, and in the working region of the thermoforming machine.

The loading unit may in particular be displaceable above the deposition device and above the table device. On the second portion of the loading unit, a cutting may also be receivable on the lower face of the loading unit, the loading unit, in particular in the region of the lower face thereof, preferably also being equipped with receiving means in the region of the second portion.

In embodiments in which the loading unit is equipped with the first and the second portion, the first and/or second portion may be displaceable into the working region of the thermoforming machine.

In an embodiment, the table device of the loading device is formed with a movable table, which may be movable transverse to a movement direction of the loading unit, preferably substantially vertically. With this embodiment, the arrangement may be operated in a further mode of operation, in which a stack of previously prepared, stacked cuttings of a starting material for the thermoforming is arranged on the table. These cuttings can be removed from the stack individually in succession using the loading unit and transported into the working region of the thermoforming machine. In this mode of operation of the arrangement, in particular the at least partially automated provision of the cuttings on the deposition device may be interrupted or suspended. The stack may be deposited either directly on the table or on a pallet which is in turn arranged on the table. Thus, the arrangement can be operated in at least two different modes of operation, either with external provision of a cutting on the deposition device, in an at least partially automated manner, for example from rolled goods directly during the production process or else individually as plate goods, or, in an alternative mode of operation, with a stack of already finished cuttings, for example plate goods, being provided on the table. The arrangement can thus be operated in a highly flexible manner.

In some embodiments, the table may, by way of example, be displaceable cyclically. This can be useful for a mode of operation in which the thermoforming starts from a cutting stack.

In particular, the deposition device is arranged upstream from a loading device comprising the loading unit. In this case, the deposition device may by way of example be arranged outside the loading device.

In another embodiment, a loading device which comprises the loading unit and the deposition device may be provided, the deposition device being arranged in particular inside the loading device.

Further, in a preferred embodiment, the loading device of the thermoforming machine is arranged upstream from and/or physically alongside the thermoforming machine.

Using the thermoforming machine, the starting material in the working region can be subjected to thermoforming to produce shaped parts. As a starting material, for example a film or plate material, in particular a plastics material film or plate material, is supplied to the thermoforming machine as the semi-finished product.

The thermoforming machine is in particular formed as a closed-chamber thermoforming machine, which has a machine housing which is closed and sealed during operation. However, the invention may also be applied in connection with thermoforming machines of other types.

In an embodiment of the thermoforming arrangement, the loading device is arranged between the thermoforming machine and the deposition device.

In an embodiment, to provide the cutting of the starting material on the deposition device, a piece of a starting material provided as rolled goods is unrolled, in particular deposited on the deposition device at least in portions, and separated off from the remaining rolled goods to form the cutting.

In an alternative embodiment, the cutting of the starting material is provided on the deposition device as a cutting of plate goods.

The advantages of providing the starting material as rolled or plate goods were each explained previously above.

The above embodiments and developments may be combined with one another, within reason. Further possible embodiments, developments and implementations of the invention also include combinations not explicitly mentioned of features of the invention which are described above or in the following in relation to the example embodiments. In particular, a person skilled in the art will also add individual aspects to each basic form of the invention as improvements or supplements.

The above-described embodiments and developments may be applied analogously in each case to the arrangement for supplying the semi-finished product to a thermoforming machine, to the arrangement for thermoforming, and to the method for supplying the semi-finished product.

BRIEF DESCRIPTION OF THE DRAWINGS

Hereinafter, the invention is described in greater detail with reference to the example embodiments set out in the schematic drawings, in which.

The accompanying drawings are intended to convey a further understanding of the embodiments of the invention. They illustrate embodiments, and serve, in connection with the description, to describe principles and concepts of the invention. Other embodiments and many of the stated advantages are apparent from the drawings. The elements of the drawings are not necessarily shown to scale with one another.

In the drawings, unless stated otherwise, like, functionally equivalent and equivalently operating elements, features and components are provided with like reference numerals in each case.

Without further elaboration, it is believed that one skilled in the art can, using the preceding description, utilize the present invention to its fullest extent. The preceding preferred specific embodiments are, therefore, to be construed as merely illustrative, and not limitative of the remainder of the disclosure in any way whatsoever.

In the foregoing and in the examples, all temperatures are set forth uncorrected in degrees Celsius and, all parts and percentages are by weight, unless otherwise indicated.

The entire disclosures of all applications, patents and publications, cited herein and of corresponding European application No. 20201139.1, filed Oct. 9, 2020, are incorporated by reference herein.

DESCRIPTION OF EXAMPLE EMBODIMENTS

Figure 1:
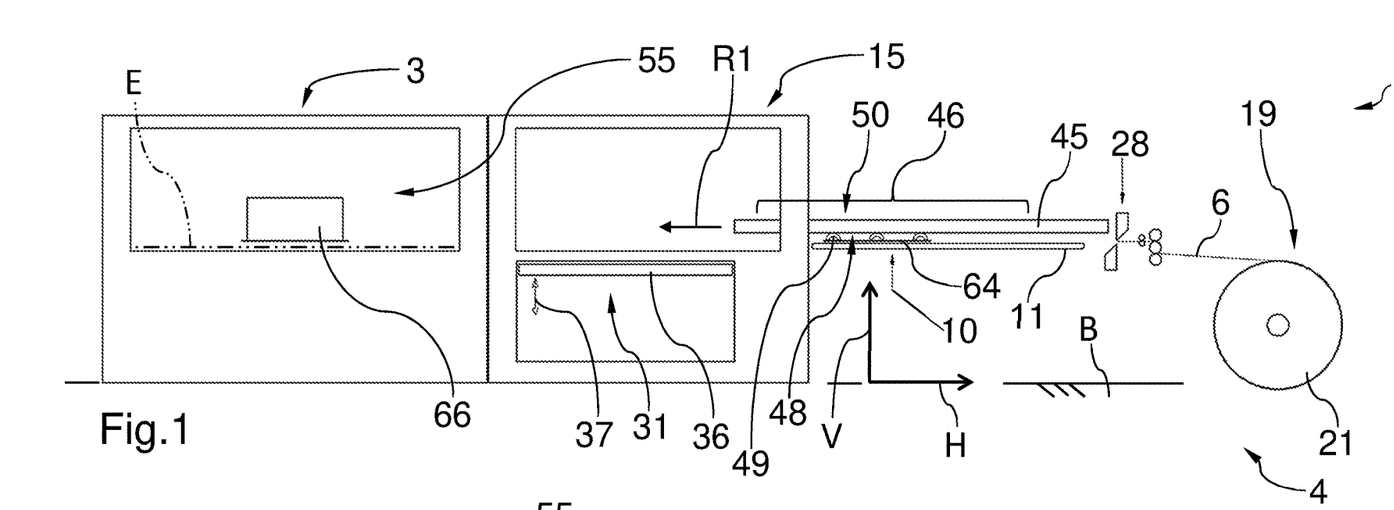
FIG. 1 is a schematic side view of an arrangement in accordance with a first example embodiment, in a first work stage for producing shaped parts.

FIG. 1 shows a thermoforming arrangement 1, comprising a thermoforming machine 3 and an arrangement 4, associated with the thermoforming machine 3, for supplying a semi-finished product to the thermoforming machine 3 as a starting material 6 for the thermoforming. In FIG. 1, rolled goods are used as the semi-finished products supplied as a starting material 6.

The arrangement 4 comprises a deposition device 10 and a loading device 15. In FIG. 1, the arrangement 4 further comprises an unrolling device 19 for unrolling the rolled goods from a roll 21 and a separating device 28 for separating off pieces of the rolled goods. In FIG. 1, the thermoforming machine 3, the loading device 15 and the deposition device 10 are arranged side by side, in this order, along a horizontal direction H and placed on a substantially horizontal base B, a support frame or the like for the deposition device 10 not being shown for improved clarity. In FIG. 1, the loading device 15 is thus arranged alongside and adjacent to the thermoforming machine 3, the deposition device 10 being provided outside, upstream from, and adjacent alongside the loading device 15. The separating device 28 and the unrolling device 19 are provided upstream from the deposition device 10 in the horizontal direction H. The separating device 28 is thus arranged downstream from the unrolling device 19 along the conveying path of the starting material 6, between the unrolling device 19 and the deposition device 10. For the separating device 28 and the unrolling device 19, housings or support frames are again not shown in each of the drawings for improved clarity.

On the roller 21, the semi-finished product is provided as rolled goods and as a starting material 6 for the thermoforming in the thermoforming machine 3. The starting material 6 is in particular a plastics material film, for example formed using a thermoplastic plastics material. Rolled goods are often more cost-effective than plate goods.

The loading device 15 has a table device 31, which is formed with a movable table 36 displaceable substantially in a vertical direction V. The displaceability of the table 36 is indicated schematically by an arrow 37 in FIG. 1.

The loading device 15 further has a movable loading unit 45, which is formed as a movable loading carriage and is displaceable substantially in the horizontal direction H above the table device 36 and the deposition device 10. The loading unit 45 has a portion 46, the loading unit 45 being equipped, on the lower face 48 thereof in the region of the portion 46, with receiving means 49 set up for cuttings of the starting material 6 to be received on the portion 46. For example, the receiving means 49 may be formed as a suction device in each case. Only a few of the receiving means 49 are schematically indicated for the portion 46 in FIG. 1.

The thermoforming machine 3 of FIG. 1 is for example a closed-chamber thermoforming machine. FIG. 1 shows a working region 55 of the thermoforming machine 3, as well as an inlay plane or tentering plane E for the starting material 6 which is to be thermoformed. The inlay plane E is shown schematically in FIG. 1 in double-dot-dashed lines. Below the inlay plane E, in the thermoforming machine 3, there is a machine housing which is closed and sealed during operation of the thermoforming machine 3. A shaping tool and a tenter, in particular movable above the inlay plane E and in particular also serving to grip the starting material 6 in place, for example in the plane E, are also not shown in greater detail in FIG. 1 for improved clarity. Likewise, a heating system for warming the material to be processed is not shown.

The mode of operation of the arrangements 1, 4 of FIG. 1 is described in the following.

Figure 2:
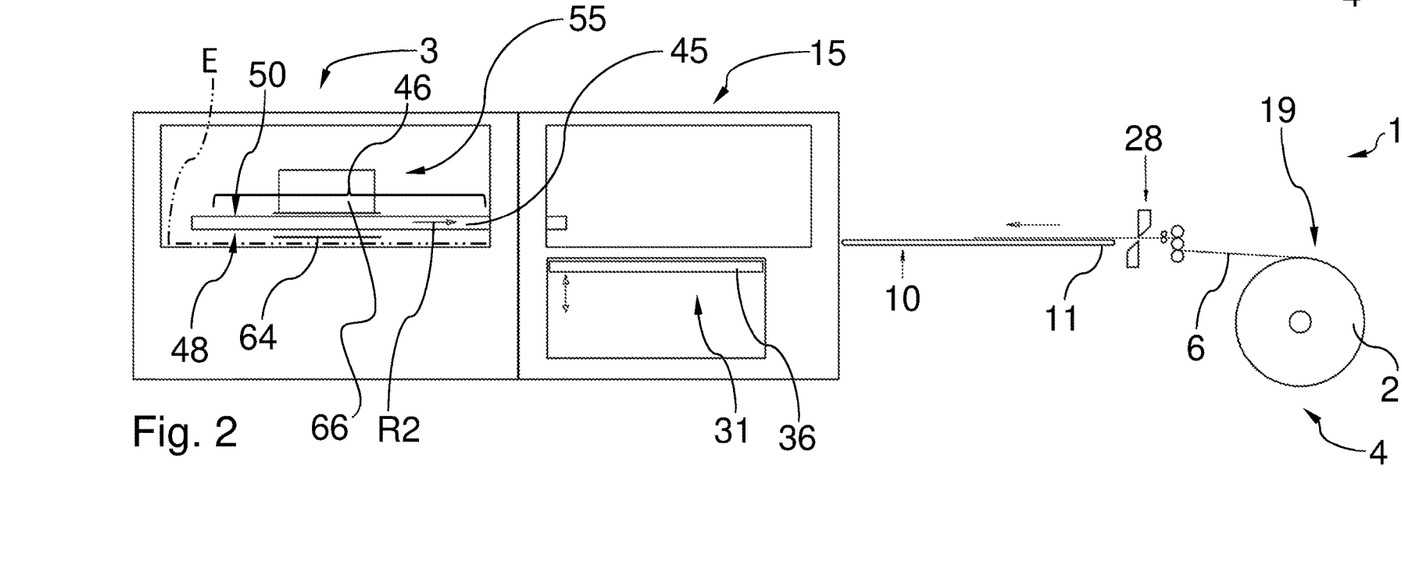
FIG. 2 shows the arrangement of FIG. 1 in a second stage following the first stage.

To supply the semi-finished product to the thermoforming machine 3 as a starting material 6 for the thermoforming, initially a piece is unrolled from the rolled goods on the roll 21 using the unrolling device 19. During the unrolling, the starting material 6, and thus at least part of the unrolled piece thereof, is deposited in portions on the deposition device 10. The process is illustrated in FIG. 2 for a later work stage.

The deposition device 10 has a belt-like transportation device 11, which is formed by way of example as a drivable endless belt and which provides a horizontal deposition surface, movable in the horizontal direction H, in the region of an upper face of the transportation device 10. The unrolled piece of the starting material 6 can thus reliably be deposited flat and horizontal.

When the desired amount of the starting material 6 has been unrolled and deposited on the deposition device 10, the deposited piece is cut off from the rest of the rolled goods using the separating device 28, which in FIG. 1 is formed as a cutting device, causing a cutting 64 to be provided on the deposition device 10, said cutting subsequently being subjected to thermoforming in the thermoforming machine 3 to produce a shaped part 66. A shaped part 66 already produced in a preceding work cycle is sketched schematically in the working region 55 of the thermoforming machine 3 in FIG. 1.

The above-described provision of the cutting 64 on the deposition device 10 takes place in an at least partially automated manner, preferably fully automatically. For this purpose, the arrangement 4 is preferably equipped with suitable control devices, sensor devices and drives and/or actuators, which make a corresponding automated operation possible but which are not shown in the drawings for improved clarity.

In the stage shown in FIG. 1, the cutting 64 is received on the portion 46 of the loading unit 45 using the receiving means 49. In the placement or first position shown in FIG. 1 of the loading unit 45, the portion 46 and the majority of the loading unit 45 protrude out of the loading device 15 on the side of the loading device 15 remote from the thermoforming machine 3 and extend horizontally over the deposition device 10. FIG. 1 shows that in this step the cut-off film cutting 64 of the rolled goods is passed over to the lower face 48 in the region of the portion 46. Thus, in FIG. 1, the loading unit 45 is positioned for receiving the cutting 64 from the deposition device 10. After the cutting 64 is received on the portion 46 positioned above the deposition device 10, the loading unit 45 is displaced in a direction R1 parallel to the horizontal direction H, in such a way that the loading unit 45 is moved from the first position, in which the portion 46 is positioned for receiving the cutting 64 from the deposition device 10, into a second portion, in which the portion 46 is displaced into the working region 55 of the thermoforming machine 3; see FIG. 2. In FIG. 2, the portion 46 of the loading unit 45 is positioned for depositing the cutting 64, previously received from the deposition device 10, in the working region 55, and the cutting 64 is deposited there directly. When the loading unit 45 moves between the position of FIG. 1 and that of FIG. 2, the loading unit 45 is displaced over the table device 31, which is not used further in this process.

The loading device 15 is formed in such a way that the shaped part 66 produced by thermoforming in the preceding work cycle can be deposited on an upper face 50 of the loading unit 45. This is shown in FIG. 2. The demoulded shaped part 66 is gripped by the tenter (not shown in greater detail in the drawings) and raised in the vertical direction V, before the loading unit 45 travels, as shown in FIG. 2, into the working region 55 horizontally in the direction R1. As described, the loading unit 45 is carrying the cutting 64 on the lower face 48 of said unit in the portion 46. In the state shown in FIG. 2, the tenter has dropped or deposited the shaped part 66 on the upper face 50 of the loading unit 45, while substantially simultaneously the cutting 64 received on the portion 46 is deposited in the working region 55 for the next shaping process.

During continued production of successive shaped parts 66, the stages or method steps shown in FIGS. 1 and 2 are repeated alternately, resulting in successive cuttings 64 of the starting material 6 being transported into the working region 55 by means of the loading unit 45 and finished shaped parts 66 being transported out of it. A plurality of shaped parts 66 are manufactured in this manner.

During the above-described process shown in FIG. 2, a further cutting 64 is provided on the deposition device 10 in an at least partially automated manner by unrolling and cutting to size using the unrolling device 19 and the separating device 28. After the second stage shown in FIG. 2 is ended, the portion 46 of the loading unit 45 is displaced over the deposition device 10 again in a second direction R2 counter to the first direction R1 and substantially parallel to the horizontal direction H.

In another mode of operation, which will now be described with reference to FIG. 3, the table 36 may be set up to receive a stack 78 of cuttings, in particular cuttings of plate goods, it being possible for this stack 78 to be arranged on the table 36 directly or by way of a pallet (not shown in the drawings) provided for this purpose. In the mode of operation of FIGS. 1 and 2, a stack 78 of this type is absent; instead, in FIGS. 1 and 2, cuttings 64 provided individually in succession in an automated manner are received by the deposition device 10, transported directly into the working region 55 and deposited there, and thus processed in succession in the thermoforming machine 3.

In the above, it was previously described that the table 36 is displaced in the displacement direction 37 substantially parallel to the vertical direction V and thus transverse to the horizontal movement directions R1, R2 of the loading unit 45. The table 36 may in particular be displaceable in a cycled manner.

Figure 3:
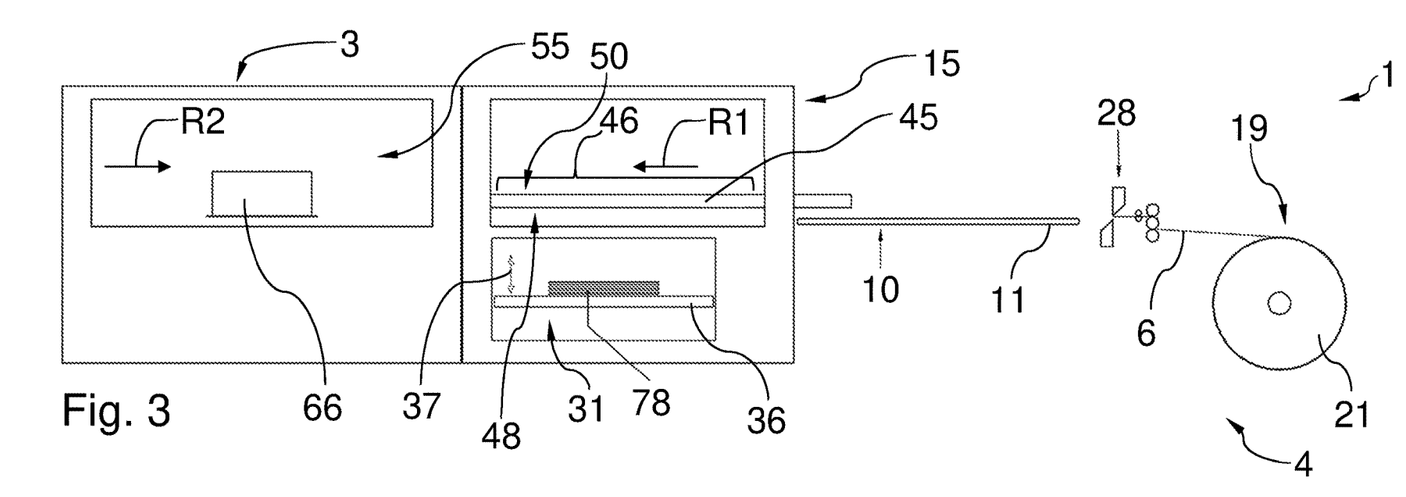
FIG. 3 shows the arrangement of FIG. 1 operating in an alternative mode of operation.

FIG. 3 illustrates how the stack 78 of a plurality of material cuttings of a starting material 6, for example a plate stack or film stack, is arranged on the table 36 in the other mode of operation of the arrangements 1, 4, modified from that of FIGS. 1 and 2. In this mode of operation, the cuttings provided as a plate stack 78 are processed into shaped parts 66 by thermoforming them.

In the mode of operation of FIG. 3, the unrolling device 19 is not used, and the separating device 28 is also not actuated in this mode of operation. In the mode of operation of FIG. 3, no cuttings are received on the portion 46 from the deposition device 10. Instead, successive individual cuttings are each received from the upper end of the stack 78 at the portion 46, and subsequently the portion 46 is displaced into the working region 55 in the direction R1 by moving the loading unit 45, so as to deposit the cutting previously received from the stack 78 in the working region 55 and simultaneously to accept the finished shaped part 66 of the preceding work cycle on the upper face 50 of the loading unit 45. Subsequently, the loading unit 45 is displaced back in the direction R2 into the position of FIG. 3, in which it is positioned above the table 36 of the table device 31.

In the mode of operation of FIG. 3, the table 36 may be displaced upwards in a cycled manner. Even though in FIG. 3 the stack 78 is shown as deposited directly on the table 36, it is conceivable to arrange the stack 78 on a suitable pallet (not shown in the drawings) and then to place the pallet on the table 36 before operation of the arrangement 1, 4 is started. The additional height of the pallet is taken into account in the displacement of the table 36.

The arrangement 4 comprising the vertically displaceable table 36 and the deposition device 10 arranged outside the loading device 15, advantageously makes operation in a plurality of modes of operation possible, with the starting material 6 being supplied from the roll 21 as a semi-finished product and the cuttings 64 successively being cut to size and provided on the deposition device 10 in an automated manner, or alternatively with cuttings being supplied by receiving them from a stack 78, provided in advance, of plate cuttings or film cuttings. The arrangement 1 comprising the arrangement 4 can thus be used highly flexibly.

Thus, in the arrangement 1, in the various modes of operation, the cuttings 64 and the shaped part 66 can be treated in an analogous and thus consistent manner when being supplied or removed from the thermoforming machine 3, irrespective of whether plate goods or rolled goods are used as a starting material. In addition, a negative effect on the achievable drawing depth, both in a positive and in a negative direction, as calculated from the plane E, can be prevented by the transportation processes using the arrangement 4, as described above.

Advantageously, in the arrangement 1 of FIGS. 1 to 3, rolled goods can be used if the desired starting material 6 is available as rolled goods. If the starting material 6 is too thick, for example, to be provided on a roller, it is alternatively possible to work from the plate stack 78. The arrangement 1 thus makes it possible to exploit the cost-effectiveness of rolled goods while simultaneously being flexible.

In addition, if the cutting 64 is supplied and the shaped part 66 transported in the manner described with reference to FIGS. 1 to 3, no material particles or splinters brought about by the transportation mechanism occur. This contributes to the possibility of producing high-grade shaped parts 66 with only a little scrap.

Figure 4:
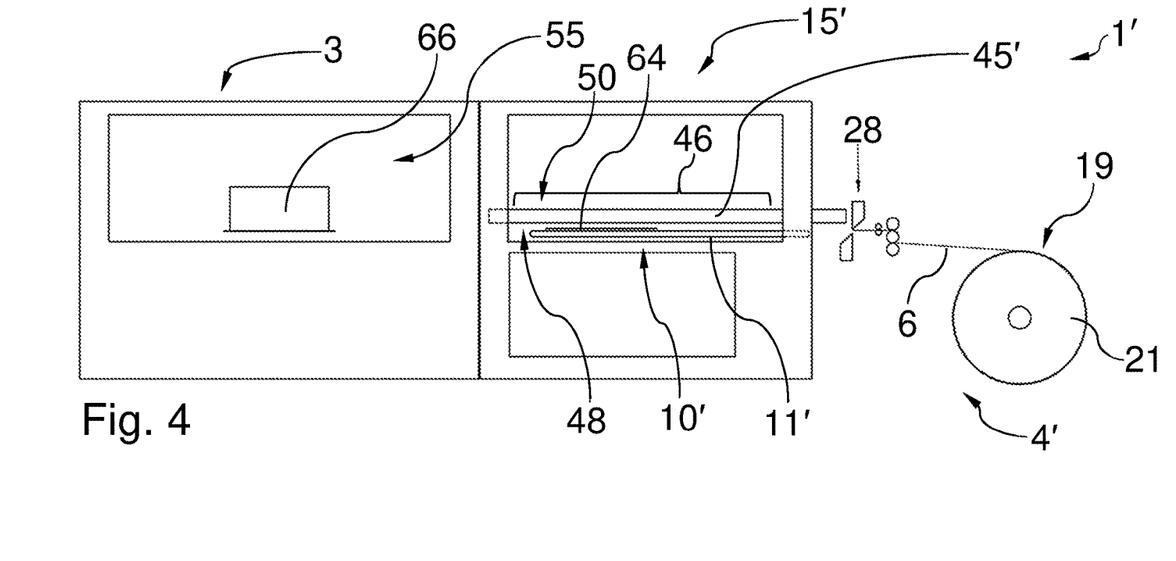
FIG. 4 is a schematic side view of an arrangement in accordance with a second example embodiment, in a first work stage for producing shaped parts.
Figure 5:
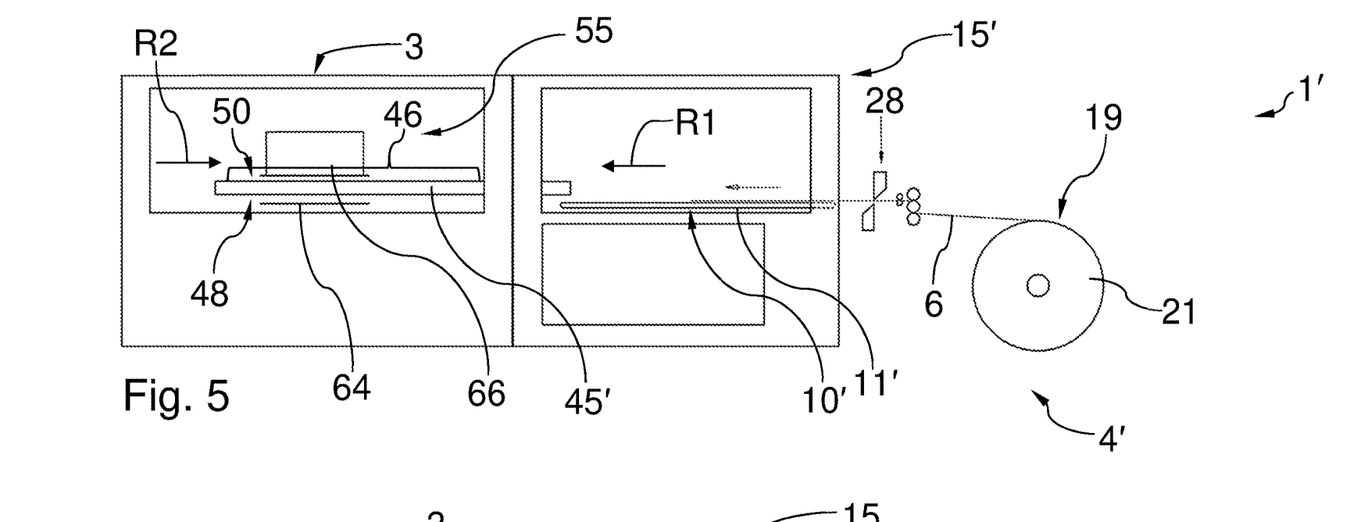
FIG. 5 shows the arrangement of FIG. 4 in a second stage following the first stage.

A thermoforming arrangement 1' in accordance with a further example embodiment is shown in FIGS. 4 and 5. The arrangement 1' differs from the arrangement 1 in that, instead of the loading device 15, a loading device 15' is provided, comprising a loading unit 45' formed analogously to the loading unit 45 of FIGS. 1 to 3 but without the table device 31 comprising the displaceable table 36. In this context, the deposition device 10', for cuttings 64 of the starting material 6 which are to be processed in succession and which are each provided in an at least partially automated manner, is arranged inside the loading device 15'. Beyond this, the deposition device 10', which like the deposition device 10 of the first example embodiment has a belt-like transportation device 11', does not differ from the deposition device 10 of FIGS. 1 to 3.

The arrangement 4' of FIG. 4, 5, formed with the deposition device 10' and the loading device 15' as well as the unrolling device 19 and the separating device 28, for supplying the semifinished product can be constructed more compactly in the horizontal direction H, but unlike the arrangement 4 of FIGS. 1 to 3 does not provide the option of loading a plate stack 78.

During operation of the arrangement 1' of FIGS. 4 and 5, the cutting 64 is received from the deposition device 10' by the portion 46 of the loading unit 45' in FIG. 4 and, analogously to what is described for FIGS. 1 to 3, is brought into the working region 55 of the thermoforming machine 3. Upon travel back out of the working region 55, a shaped part 66 formed in a previous work cycle is transported out, again analogously to the first example embodiment.

Figure 6:
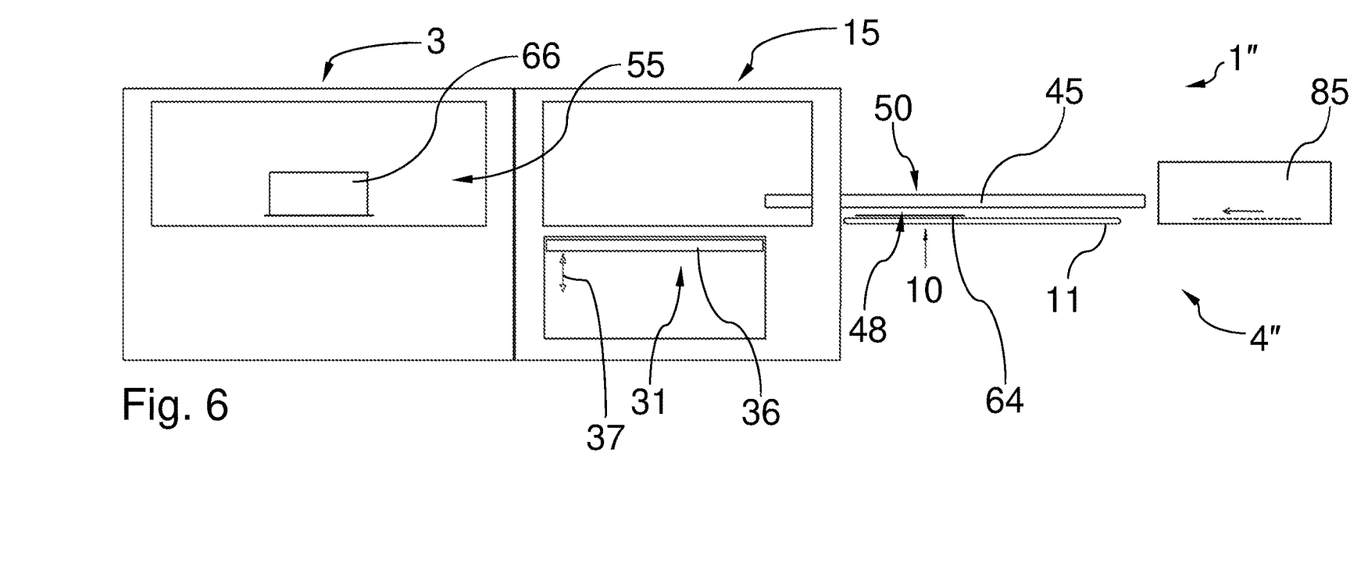
FIG. 6 is a schematic side view of an arrangement in accordance with a third example embodiment.

A thermoforming arrangement 1" comprising an arrangement 4" for supplying a semi-finished product in accordance with a further example embodiment is shown in FIG. 6.

The construction and operation of the arrangement 1" are analogous to the descriptions given for FIGS. 1 to 3, with the exception of the differences described in the following. In FIG. 6, a mode of operation is again possible in which cuttings 64 are provided on the deposition device 10 successively in an automated manner. Further, a mode of operation in which starting material is processed from a stack 78, analogously to FIG. 3, is also possible.

Unlike in FIGS. 1 to 3, however, the arrangement 4" of the arrangement 1" has neither the unrolling device 19 nor the separating device 28. Instead, in accordance with FIG. 6, a further workstation 85 of the deposition device 10 may be positioned upstream, although the workstation 85 is not compulsory. Individual cuttings 64 are successively provided from an external source in succession, pass through the workstation 85, which may for example be a cleaning device, individually in the example shown in FIG. 6, and then arrive on the deposition device 10. This provision process is again preferably fully automated. In FIG. 6 too, the deposition device 10 is equipped with a belt-like transport device 11 by way of example. The cuttings 64 are processed further analogously to the operation described for FIGS. 1 to 3. If the arrangement 1" is operated in the mode of operation analogous to FIG. 3, it can be provided that the workstation 85, if present, is switched off or set to an idle state, and no cuttings 64 can be conveyed to the deposition device 10 from an external source.

In the example embodiment of FIGS. 4 and 5 too, the unrolling device 19 and the separating device 28 can further be omitted and replaced with a preferably fully automatic supply of individual, successive cuttings 64, for example analogously to FIG. 6 and if required with the workstation 85 being positioned upstream.

Figure 7:
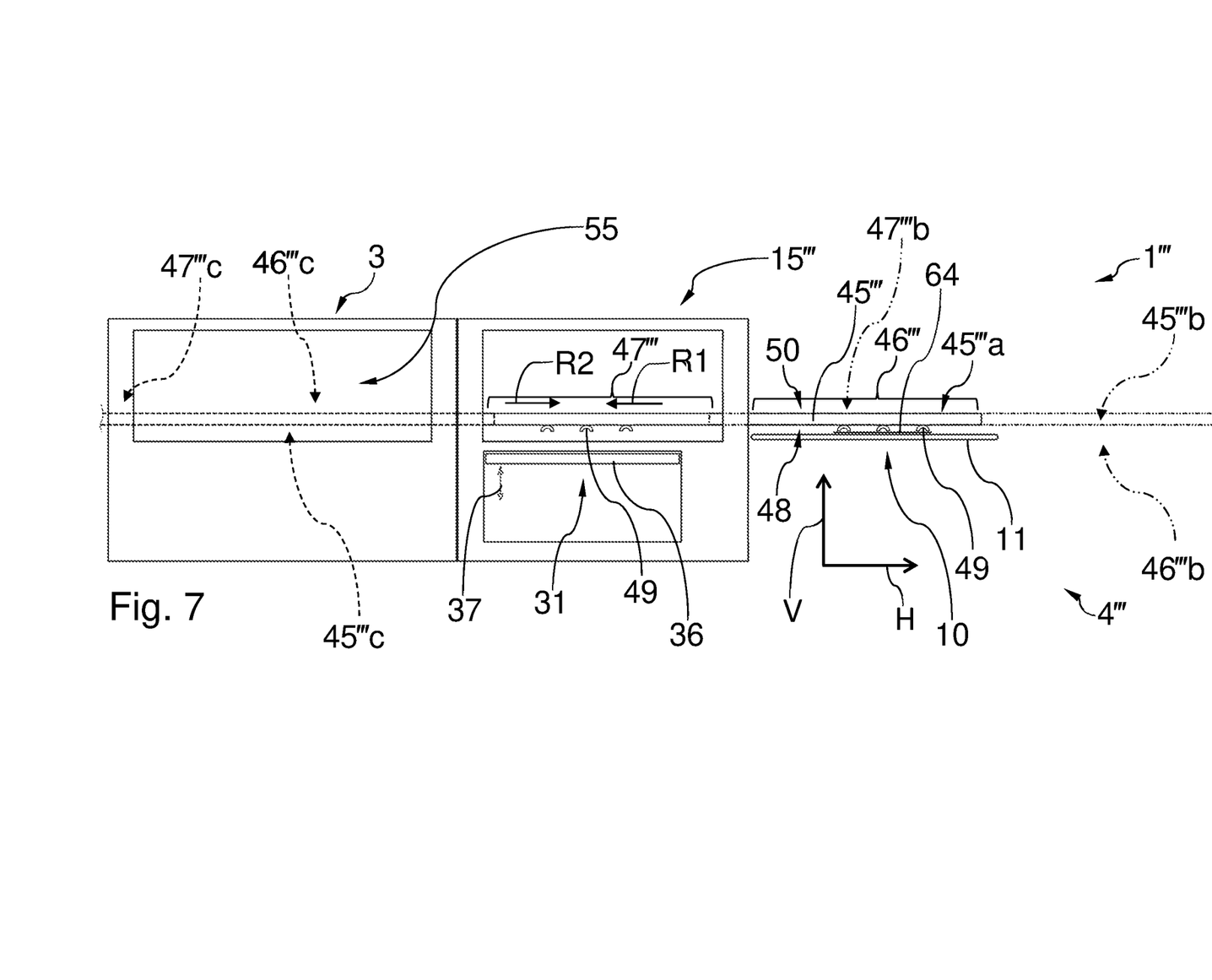
FIG. 7 is a schematic side view of an arrangement in accordance with a fourth example embodiment.

A fourth example embodiment is illustrated in FIG. 7. Again, the differences from the first example embodiment will be described hereinafter.

FIG. 7 shows a thermoforming arrangement 1''', comprising a thermoforming machine 3 and an arrangement 4''' upstream therefrom for supplying a semi-finished product to the thermoforming machine 3 as a starting material 6 for the thermoforming. The arrangement 4''' has a loading device 15''', as well as a deposition device 10 analogous to that of the first example embodiment. Further, in the case of the arrangement 4''', an unrolling device 19 and a separating device 28, as described above, or instead a supply from an external source with optional interposition of the workstation 85, as described for FIG. 6, may be provided. This not shown in FIG. 7 for simplicity and improved clarity.

A movable loading unit 45''' of the loading device 15''' has a first portion 46''' and a second portion 47''', which are arranged on the loading unit 45''' in succession in a horizontal direction H and in a movement direction R1, R2 of the loading unit 45'''. The loading unit 45''' is thus formed extended with respect to the loading unit 45, 45' of the above-described example embodiment. In the region of the lower face 48 thereof, the loading unit 45''' is equipped with the above-described receiving means 49 in each of the portions 46''' and 47'''. In this way, the first and second portions 46''', 47''' are each set up for the cutting 64 to be received on the portion 46''', 47'''. The portions 46''' and 47''' are provided in a fixed physical relationship with one another on the loading unit 45'''.

In the example embodiment of FIG. 7 too, the loading device 15''' has a table device 31 comprising a table 36, as described above in relation to the first example embodiment. Again, in the arrangement 4''' of FIG. 7, the table 36 can be used for receiving a plate stack 78 if required.

The loading unit 45''' is movable above the table device 31 and the deposition device 10 in the two opposite directions R1, R2 in the horizontal direction H.

In a first variant of the arrangement 4''' of the fourth example embodiment, the loading unit 45''' may be positionable in such a way that the second portion 47''', which is arranged closer than the first portion 46''' to the thermoforming machine 3, can be positioned to receive a cutting 64 from the deposition device 10. In FIG. 7, a corresponding position of the loading unit 45''' is illustrated in a double-dot-dashed line and labelled with reference numeral 45'''b.

After the cutting 64 is received from the deposition device 10, the first variant provides that the portion 47''' of the loading unit 45''' travels into the working region 55 of the thermoforming machine 3 in the direction R1, so as to deposit the cutting 64 in the working region 55 and simultaneously to receive a finished shaped part 66 on the upper face 50 thereof. The loading unit 45''' then travels back out of the working region 55 in the direction R2 opposite R1.

This process can be repeated several times to produce a series of shaped parts 66, the first portion 46''' not being used.

In a further variant, the cutting 64, again provided preferably in an automated manner on the deposition device 10, can be received on the lower face 48 of the loading unit 45''' using the portion 46'''. In this second variant, just as in the first variant above, the cutting 64 is transported directly into the thermoforming machine 3, for which purpose the loading unit 45''' is moved into the thermoforming machine 3 in the direction R1, in such a way that the first portion 46''' is positioned in the working region 55 and can deposit the cutting 64 there as well as accepting a shaped part 66 in the region of the upper face 50 of the loading unit 45''', this position of the loading unit 45''' and the first portion 46''' being sketched in dashed lines and labelled 45'''c and 46'''c respectively in FIG. 7.

In a further variant of the arrangement 4''' in accordance with the fourth example embodiment of FIG. 7, it may be provided that in a first position, illustrated in solid lines and labelled 45''' in FIG. 7, the first portion 46''' can be positioned for receiving one of the cuttings 64 from the deposition device 10 and the second portion 47''' can be positioned for preferably simultaneously receiving another cutting 64 (not shown in FIG. 7) from the table device 31. Subsequently, the loading unit 45''' can be displaced in the direction R1, in such a way that the second portion 47''' is displaced into the working region 55. In this second position (not illustrated in detail in FIG. 7), the first portion 46''' is thus arranged above the table device 31, while the second portion 47''' is displaced into the working region 55 of the thermoforming machine 3. In this second position, the first portion 46''' is thus positioned for depositing the cutting 64, previously received from the deposition device 10, on the table device 31, whereas the second portion 47''' is positioned for depositing the other cutting 64, previously received from the table device 31, in the working region 55 of the thermoforming machine 3. In this mode of operation too, after the cuttings 64 are deposited the shaped part 66 can be laid or dropped on the upper face 50 of the loading unit 45''' in the region of the second portion 47''', whereupon the loading unit 45''' travels back out of the thermoforming machine 3 in the direction R2 into the position 45''' a shown in solid lines in FIG. 7. The above-described process can thus be repeated, the first portion 46''' and the second portion 47''' simultaneously receiving a cutting 64 from the deposition device 10 and a cutting 64 from the table device 31 respectively in the first position 45''' a of the loading unit 45''', the loading unit 45''' thereupon being displaced in the direction R1, and then the cuttings 64 simultaneously being deposited in the working region 55 by the second portion 47''' and on the table 36 by the first portion 46'''. Cuttings 64 can thus be transported into the working region 55 in two steps, with intermediate deposition thereof on the table 36 of the table device 31.

If required, the above variants of the operation of the arrangement 1''', 4''' in accordance with the fourth example embodiment may be combined as required. These variants may also, as described above, be combined with the use of cuttings from a stack 78.

It should further be noted that in FIG. 7, although the table device 31 is shown with a table 36 displaceable in a vertical direction V, the table 36 may instead be formed stationary if the use of a stack 78 is not provided.

In addition, in some variants of the above example embodiments, the workstation 85 of FIG. 6 may be interposed between the separating device 28 and the deposition device 10.

In the above-described example embodiments, the second direction R2 extends parallel and counter to the first the direction R1 and parallel to the horizontal direction H in each case.

In particular, the arrangements 1, 1', 1", 1''' are operated in an at least partially automated manner but preferably fully automatically, in particular with automated provision of the cuttings 64 on the deposition device 10.

Even though in the above the deposition devices 10, 10' are preferentially described as formed with a transport device 11, 11', it will be appreciated that in variants of the above example embodiments the deposition device 10, 10' may in each case be formed as a table having a deposition surface which is not provided for movement during operation.

Although the invention has been completely described in the above by way of preferred example embodiments, it is not limited thereto, but rather can be modified in various manners.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

LIST OF REFERENCE NUMERALS

1, 1', 1", 1''' Thermoforming arrangement
3 Thermoforming machine
4, 4', 4", 4''' Arrangement for supplying a semi-finished product
6 Starting material
10, 10' Deposition device
11, 11' Transportation device
15, 15', 15''' Loading device
19 Unrolling device
21 Roll
28 Separating device
31 Separating device
36 Table
37 Displacement direction (table)
45, 45', 45''' Loading unit
46 Portion
46''' First portion
47''' Second portion
48 Lower face (loading unit)
49 Receiving means
50 Upper face (loading unit)
55 Working region (thermoforming machine)
64 Cutting
66 Shaped part
78 Stack
85 Workstation
B Base
E Inlay plane
H Horizontal direction
V Vertical direction
R1 First movement direction (loading unit)
R2 Second movement direction (loading unit)

The invention claimed is:

1. An arrangement (4; 4'; 4"; 4''') for supplying a semi-finished product to a thermoforming machine (3) as a starting material (6) for thermoforming, wherein the thermoforming machine is formed as a closed-chamber thermoforming machine, which has a machine housing that is closed and sealed during operation:
   wherein the arrangement (4; 4'; 4"; 4''') has a deposition device (10; 10') on which cuttings (64) of the starting material which are to be processed in succession can be provided, in each case in an at least partially automated manner, and a movable loading unit (45; 45'; 45''');
   wherein the loading unit (45; 45'; 45''') is set up for at least one of the cuttings (64) to be received on the loading unit (45; 45'; 45'''), wherein the cuttings are each received on a lower face (48) of the loading unit, and the loading unit is equipped with receiving means (49), in a region of the lower face thereof;
   wherein the loading unit (45; 45'; 45''') can be positioned to receive the cutting (64) from the deposition device (10; 10'), and wherein the loading unit (45; 45'; 45''') can subsequently be positioned to deposit the cutting (64) received from the deposition device (10; 10') in a working region (55) of the thermoforming machine (3); and
   wherein the arrangement includes an unrolling device (19) for unrolling rolled goods, the unrolling device being arranged upstream from the deposition device, and the arrangement includes a separating device (28) configured to separate off a piece of the rolled goods, which are unrolled in regions using the unrolling device, to form the cuttings of the starting material, or
   wherein the arrangement is set up for providing the cuttings of the starting material on the deposition device individually as a cutting of plate goods in each case.

2. The arrangement according to claim 1,
   wherein the separating device is configured to separate off the piece of rolled goods, which are unrolled in regions using the unrolling device and deposited at least in regions on the deposition device to form the cuttings of the starting material.

3. The arrangement according to claim 1,
   wherein the separating device (28) is formed as a cutting device.

4. The arrangement according to claim 1,
   wherein the loading unit (45; 45'; 45''') is formed as a movable loading carriage.

5. The arrangement according to claim 1,
   wherein the movable loading unit (45; 45'; 45''') is displaceable above the deposition device (10; 10').

6. The arrangement according to claim 1,
   wherein the movable loading unit (45; 45'; 45''') can be displaced at least in portions into the working region (55) of the thermoforming machine (3).

7. The arrangement according to claim 1,
   wherein the loading unit (45; 45'; 45''') is arranged movably in such a way that a shaped part (66) can be deposited on an upper face (50) of the loading unit (45; 45'; 45'''), in the position of the loading unit (45; 45'; 45''') in which the loading unit (45; 45'; 45''') is positioned for depositing the cutting (64) in the working region (55) of the thermoforming machine (3).

8. The arrangement according to claim 1,
   wherein the deposition device (10; 10') is formed with a transportation device (11; 11').

9. The arrangement according to claim 1,
   wherein the loading unit (45''') has a first portion (46''') and a second portion (47'''), the first and the second portion (46''', 47''') each being set up for a cutting (64) of the starting material (6) to be received on the portion (46''', 47'''), and the first portion (46''') being positionable for the cutting (64) to be received from the deposition device (10).

10. The arrangement according to claim 9,
    wherein the first and the second portion (46''', 47''') of the loading unit (45''') are arranged in succession in a movement direction (R1, R2) of the loading unit (45''').

11. A thermoforming arrangement (1; 1'; 1"; 1''') comprising a thermoforming machine (3) and comprising an arrangement (4; 4'; 4"; 4''') according to claim 1 for supplying a semi-finished product to the thermoforming machine (3) as a starting material (6) for the thermoforming.

12. A method for supplying a semi-finished product to a thermoforming machine (3) as a starting material (6) for thermoforming, comprising:
    providing one of a plurality of successive cuttings (64) of the starting material (6) on a deposition device (10; 10') in an at least partially automated manner;
    receiving the cutting (64) provided on the deposition device (10; 10') from said device using a movable loading unit (45; 45'; 45'''), wherein the cutting is received on a lower face (48) of the loading unit and the loading unit is equipped with receiving means (49), in a region of the lower face thereof;
    moving (R1) the loading unit (45; 45'; 45'''); and
    depositing the cutting (64) received on the loading unit (45; 45'; 45''') from the deposition device (10; 10') in a working region (55) of the thermoforming machine (3),
    wherein, to provide the cutting of the starting material on the deposition device, a piece of a starting material provided as rolled goods is unrolled and separated off from the remaining rolled goods to form the cutting, or
    wherein the cutting of the starting material is provided on the deposition device individually as a cutting of plate goods, and
    wherein the thermoforming machine is formed as a closed-chamber thermoforming machine, which has a machine housing that is closed and sealed during operation.

13. A method according to claim 12,
    wherein, to provide the cutting (64) of the starting material (6) on the deposition device (10; 10'), the piece of the starting material provided as rolled goods is unrolled, deposited on the deposition device (10; 10') at least in portions, and separated off from the remaining rolled goods to form the cutting (64).

* * * * *